Figure 1:
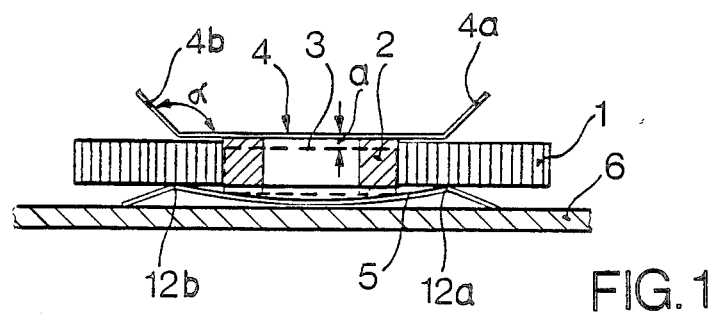

United States Patent [19]

Schoettle et al.

[11] Patent Number: 4,709,290
[45] Date of Patent: Nov. 24, 1987

[54] TAPE CASSETTE, IN PARTICULAR A MAGNETIC TAPE CASSETTE, AND A SUPPORT LINER THEREFOR

[75] Inventors: Klaus Schoettle, Heidelberg; Roland Sold, Mutterstadt; Uwe Brinkmann, Kehl; Werner Wagner, Oberkirch, all of Fed. Rep. of Germany

[73] Assignee: BASF Aktiengesellschaft, Ludwigshafen, Fed. Rep. of Germany

[21] Appl. No.: 691,852

[22] Filed: Jan. 16, 1985

[30] Foreign Application Priority Data

Jan. 20, 1984 [DE] Fed. Rep. of Germany ... 8401561[U]

[51] Int. Cl.$^4$ .............................................. G11B 23/02
[52] U.S. Cl. ...................................... 360/132; 242/199
[58] Field of Search ............................... 360/132–133; 242/198–199

[56] References Cited

U.S. PATENT DOCUMENTS 3,857,532 12/1974 Bastiaans ............................ 242/199
3,977,626 8/1976 Gaiser ................................. 242/199

FOREIGN PATENT DOCUMENTS

| 7116933 | 4/1971 | Fed. Rep. of Germany . |
| 2121375 | 2/1972 | Fed. Rep. of Germany . |
| 7716771 | 11/1978 | Fed. Rep. of Germany . |
| 2736760 | 3/1979 | Fed. Rep. of Germany ...... 242/199 |
| 1245606 | 9/1971 | United Kingdom ..................... 23/4 |
| 2114934 | 1/1983 | United Kingdom ..................... 23/7 |

Primary Examiner—A. J. Heinz
Attorney, Agent, or Firm—Keil & Weinkauf

[57] ABSTRACT

A tape cassette, in particular a magnetic tape cassette, is provided, for tape and hub guidance, with bent support liners (7, 8) which are located between the roll (1) or rolls and the adjacent housing wall (6). According to the invention, bent-over or folded-over longitudinal strips (7a, 7b) which are bent at certain angles toward the housing wall (6) support the liners (7, 8) in such a way that it is possible to counteract deformation due to the weight of the rolls of tape. These liners (7, 8) can be used for all cassette recording media, but preferably for those having a very small tape thickness.

15 Claims, 5 Drawing Figures

V-V

TAPE CASSETTE, IN PARTICULAR A MAGNETIC TAPE CASSETTE, AND A SUPPORT LINER THEREFOR

This invention relates to a tape cassette, in particular a magnetic tape cassette having top and bottom walls, one or more rolls of tape on a hub or on a flanged reel onto which tape can be wound or from which tape can be unwound, one or more support liners between the roll(s) of wound tape and the bottom wall and between the said roll(s) and the top wall, each support liner having a middle part and folded longitudinal edge strips disposed laterally on opposite sides of the middle part. The invention also relates to a support liner for such a tape cassette, in particular a compact cassette.

A conventional tape cassette of the kind referred to is shown in German Utility Model No. 7,110,933. Such a known cassette is a compact cassette and contains a support liner where the edges are bent to form an angle of about 135° with the inner walls of the housing. Under the weight of the hubs with the roll or rolls of tape, the middle part of the support liner bends into a concave shape, and the roll or rolls of tape are thus thrust out of their plane of the tape path. Hence, the running tape is wound onto the hub or onto the periphery of the roll of tape in such a way that it is displaced in height. Consequently, stepped rolls and tape damage occur, and this damage may consist in stretching of the tape edges and creasing of the tape. When the tape is rewound rapidly, troublesome rattling may occur. In extreme cases, restriction of the height of the interior of the cassette due to projecting tape windings results in the roll of tape jamming and coming to a standstill, which means that the cassette has to be discarded.

In magnetic tape cassettes, the housing, the support liners, the tape and tape guide elements are preferably made of plastics material. When the reels rotate in the cassette, static electricity builds up at many points, for example as a result of separation at the tape unwinding on the hub, and as a result of friction at support liners, tape guide elements or other components of the housing. These static charges are very undesirable in magnetic tape cassettes because, owing to attractive forces, they can lead to increased friction, irregular running and uneven winding of the tape, and can also interfere with the magnetic recording or playback when abrupt discharge occurs.

In order to overcome such problems, the support liners employed are partially or completely provided with an antistatic finish. For example, low-friction teflon liners which are coated with graphite or contain graphite as a filler have been disclosed.

GB-A-2 114 934 describes a cassette which contains two sheets bonded as lamellae, one of the sheets being provided with an antifriction coating facing the roll of tape, and that side of the other sheet which faces the housing being coated with an antistatic layer. This support liner has a complex structure and is therefore expensive. It has the further disadvantage that, because of the insulating effect of the antifriction coating and/or of the two sheets and/or of the adhesive layer between the sheets, it does not provide an electrically conducting connection between the rolls of tape and the housing components and hence cannot prevent the build-up of electrostatic potential differences. It is known that this can be achieved only if there is a conducting connection, for example by means of a support liner consisting entirely of conductive material, such as a teflon/graphite laminate. However, these materials are expensive and, in the required thicknesses, are not particularly dimensionally stable, so that for mechanical reasons there are often problems with the winding behavior. Furthermore, the graphite makes such materials opaque, so that holes have to be punched out from the support liner at the cassette windows. In the region of these holes, the rolls of tape cannot be guided, and, owing to the further reduction in the mechanical stability, the holes can only be very small. This excludes the possibility of large windows, which increase the saleability of the cassette.

On the other hand, support liners consisting of transparent plastic sheets are known which possess, at the longer edges, beads which face the tape and are provided with a conductive layer. This layer ends at the punched-out edges of the support liners and therefore likewise does not provide any conducting connection between the roll of tape and the housing.

It is an object of the present invention to provide tape cassettes and support liners such that guiding of the tape in the cassette is improved and operational failure of the cassettes as a result of mechanical failure is avoided.

We have found that this object is achieved by a tape cassette of the type described in the preamble if each support liner has a middle part and folded longitudinal edge strips disposed laterally on opposite sides of the middle part, wherein each longitudinal edge strip is bent over to face its associated top or bottom wall so that at least the part of each strip adjacent to its associated middle part makes an angle of less than 90° with the plane of the middle part of the liner and so that the said edge strips of each liner support the middle part of the liner against the roll(s) of tape, within the periphery of said middle part. The preferred angular range is from about 5° to 30°, all angles stated being based on the support liner not subjected to any load.

When the longitudinal strips are supported on an even supporting surface, and one or two rolls of tape are placed in position, the support liner for a novel tape cassette advantageously remains substantially parallel to the supporting surface.

The novel support liners are of the form described below, and the tape cassettes according to the invention contain appropriately shaped sheets.

The support liners advantageously possess bent-over or folded-over longitudinal strips at the longer edges; in the simplest case, each of these strips is formed by means of a single bend at an angle with respect to the plane of the sheet, but they furthermore can have a parallel fold relative to the middle part of the sheet. Even when one or both rolls of tape are in position, the said strips can be of a design such that they come into contact with the back of the sheet.

Regarding increased protection against static charges, either the bent-over longitudinal strips can be electrically conductive, particularly on the outside, or the entire sheet can be electrically conductive. Hence, in a simple manner and an advantageous shaping procedure, an electrically conducting connection can be produced between the roll of tape and the cassette housing, so that electrostatic charge differences cannot occur.

In a particularly favorable embodiment of the support liner, it is advantageous if the distance between the bent-over longitudinal strips is chosedn so that it is equal to or slightly smaller than the diameter of the hub of the cassette, so that both the hub and the roll of tape can be supported at the same time.

Figure 2:
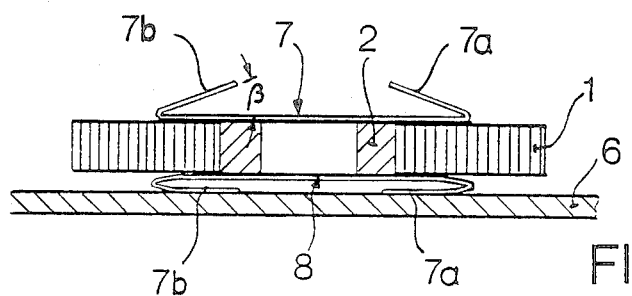
Figure 3:
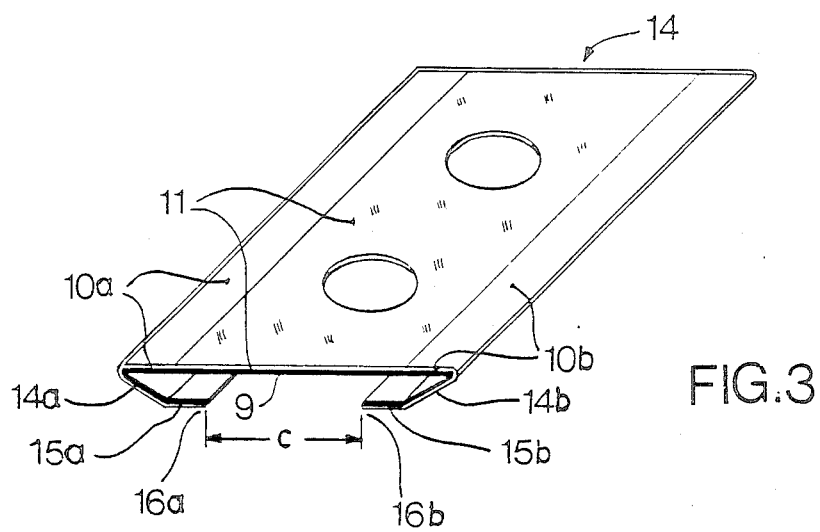
Figure 4:
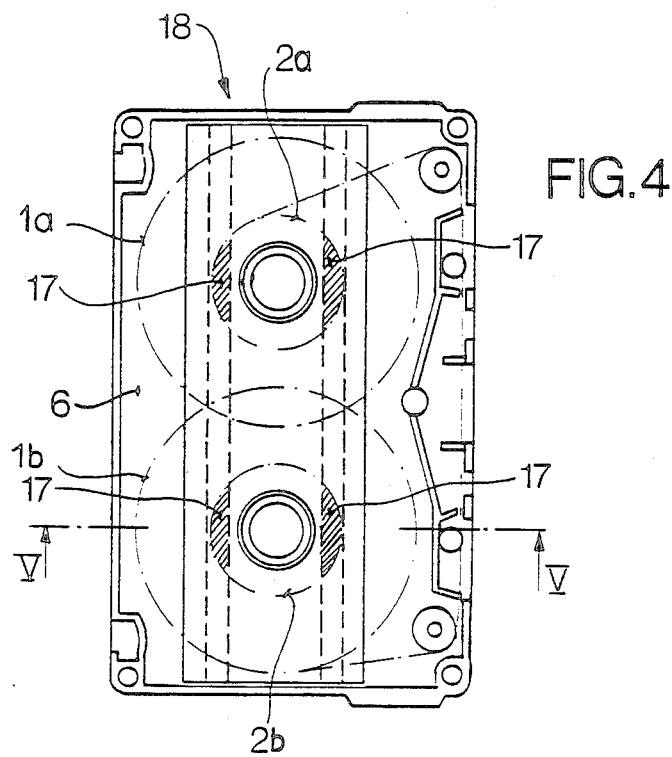
Figure 5:
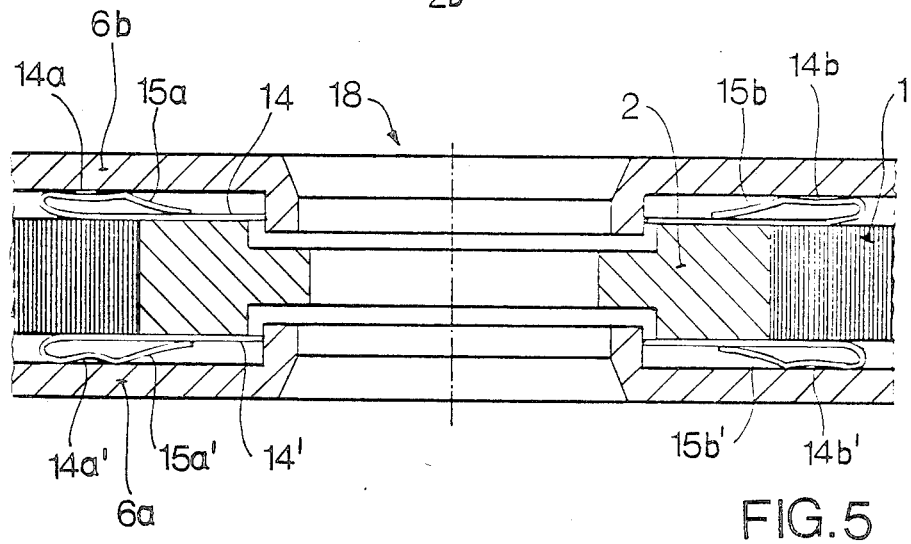

Embodiments of the invention will now be described, by way of example, with reference to the accompanying drawings, in which FIG. 1 is a cross-section through part of a known magnetic tape cassette, FIG. 2 is a cross-section through part of a tape cassette according to the invention illustrating a housing wall with novel support liners in loaded and load-free states, FIG. 3 is a perspective view of another embodiment of support liner for a tape cassette according to the invention, FIG. 4 is a plan of a compact cassette with liners each as shown in FIG. 3, and FIG. 5 is a cross-sectional view taken on the line V—V of FIG. 4.

FIG. 1 shows a known compact cassette of the type depicted in German Utility Model No. 7,110,933. This known cassette has a roll of tape 1 wound on a flangeless hub 2, a cassette housing wall 6, a support liner 5 located between the roll of tape 1 and the wall 6, and a further support liner 4 located on top of the roll of tape 1. The liners 4 and 5 have edge parts 4a, 4b and 5a, 5b, respectively, which are bent over to extend outwardly from respective middle parts of the liners, each edge part forming an angle alpha of approximately 135° with the plane of the respective middle part of the liner.

Typically in normal operation, the known cassette is disposed substantially horizontally. When so disposed the upper support liner 4 (as shown in FIG. 1) is not subjected to a substantial load but the lower support liner 5 (as shown in FIG. 1) supports the weight of the hub 2 and reel of tape 1. During cassette operation, as tape is wound onto the hub 2 the roll of tape 1 becomes larger and heavier (maximum weight in compact cassettes about 10 g), and the particular liner under load, for example the support liner 5 in FIG. 1, bends increasingly into a concave shape. Furthermore, the other hub (not shown) from which tape is being unwound is displaced in height, for example upward. Consequently, this displacement in the heights of the hubs leads to mechanical and acoustic problems during operation of the cassette or makes operation impossible.

In FIG. 2 there is shown a cassette according to the invention having liners 7 and 8 which do not resemble the conventional liners. In particular, the liners 7 and 8 have bent-over or folded-over longitudinal strips 7a and 7b which are bent over or folded over toward the middle part of the liner to form an acute angle β therewith. Hence, the outsides of the strips 7a and 7b make contact with the inner walls of the cassette over an area, instead of along an edge, and each liner is therefore supported over an area, with the result that concave bending as the roll of tape becomes larger is substantially avoided. The selected angular arrangement provided effective support for the middle part by the novel bent-over longitudinal strips only within the periphery of the middle part. The angle β can be from 0° to no more than 90° and should preferably be chosen to be from 5° to 30°.

In FIG. 2, the lower liner 8 is subjected to a load through the weight of the roll of tape 1. The spring force of the bent longitudinal strips 7a and 7b has the effect of producing convex arching of the middle part of liner 8 or of bringing its middle part into contact with the roll of tape 1. The bent-over longitudinal strips 7a and 7b, which then lie flat, support the middle part of the liner 8 on the housing wall 6 but at a distance away from the latter. The spring force can be varied via the form of bending or folding and the width of the bent-over or folded-over strips, and of course also by changing the thickness of the liner or the liner material. Since the supporting forces on the roll of tape are the same on both sides, its central position is ensured.

FIG. 3 shows in detail another novel support liner 14, which can be identical to the liners 7 in FIG. 2 when used in cassettes which can be turned over for recording/playback operation. The liner 14 possesses a particularly advantageous embodiment of bent-over longitudinal folds, which are produced by folding over strips 14a and 14b towards the central axis of the liner 14 to form an acute angle (see above). Adjacent to and outwardly of the said strips 14a and 14b are further folded-over strips 15a and 15b, respectively, which are intended to form liner-supporting parts which are roughly parallel to the plane of the liner 14 when the latter is not subjected to a load. This form of the liner 14 has advantages during assembly, ie. when the liner 14 is inserted into the cassette, since the vertical and lateral positions of the liner are better defined and more stable.

FIG. 4 shows a plan of a cassette 18, illustrating its bottom wall 6. A liner 14 as illustrated in FIG. 3 is shown between rolls of tape 1a and 1b and the adjacent bottom wall or lid wall of the cassette. As illustrated in the section V—V in FIG. 5, when the liners 14 and 14' are under tension, the folded-over strips 15a and 15b inside the upper and lower halves 6a and 6b of the housing rest from below or from above against the particular side of the liner 14 or 14' which faces away from the roll of tape 1, in such a way that additional supporting forces are effective in the areas 17 indicated by broken lines in FIG. 4. As can be seen in FIG. 4, it is advantageous to choose the width of the bent-over longitudinal strips and their arrangement so that the hubs 2a and 2b (cf. the shaded areas in FIG. 3) as well as the closer areas of the roll of tape benefit from the additional support. This can be achieved in a simple manner by choosing the distance c between the bent-over longitudinal strips (between the inner edges 16a and 16b in FIG. 3) to be the same as or smaller than the diameter of the hub 2. By means of further folds in the region of the said strips, it is possible to achieve further special spring characteristics. The particular advantages of the support liners of the present invention include the fact that the tension in folded-over strips 14a and 14b of the said longitudinal strips 7a and 7b and in the folded-over strips 15a and 15b is not reduced as a result of relaxation forces, as in the case, of the liner according to the above prior art; instead the result of the fold toward the middle part is rather to increase the tension, so that the spring, guiding and supporting function of the liner does not decrease with increasing temperature or over a period of time.

As indicated in FIG. 3, plastic sheet material forming the support liners can, before being punched out, be provided with a conductive or antistatic layer on the outside along one or more edge strips 10a and/or 10b, or can be rendered conductive in some other manner. If the adjacent inner wall of the housing of the cassette is likewise conductive or antistatic, charges or charge differences which are produced between the hub and the roll of tape are conducted away to the housing and do not cause any problems with regard to tape running or hub running. The middle part 9 of the liner 14 can be provided, for example, with an antifriction layer 11, which preferably contains an antistatic component (for example, one similar to the antistatic agent used for the cassette housing) and which can also extend over the entire liner, including the bent-over longitudinal strips. In this case, additional coatings 10a and 10b for the edges are superfluous.

The liners 7, 8, 14 and 14' can consist of any conventional and suitable liner materials, eg. polyesters, polypropylene, polyethalene, polycarbonates, etc. Advantageously, the liners are furthermore transparent, and the antifriction and antistatic agents used are likewise transparent.

The novel bent-over or folded-over longitudinal strips can be produced in a conventional manner by hot-bending or cold-bending.

We claim:

1. A tape cassette, in particular a magnetic tape cassette, having top and bottom walls, one or more rolls of tape on a hub or on a flanged reel, onto which tape can be wound or from which tape can be unwound, one or more support liners between the rolls(s) of wound tape and the bottom wall and between the said roll(s) and the top wall, each support liner having a planar middle part and folded longitudinal edge strips disposed laterally on opposite sides of the middle part, wherein each longitudinal edge strip is bent over into an overlying relationship with the middle part so that at least that portion of each strip adjacent to its associated middle part makes an angle of less than 90° with the plane of the middle part of the liner and so that the said edge strips of each liner support the middle part of the liner against the roll(s) of tape, within the periphery of said middle part.

2. A tape cassette as claimed in claim 1, wherein the said angle is from 5° to 30°.

3. A tape cassette as claimed in claim 1, wherein the bent-over longitudinal edge strips are provided at the longitudinal edges of the support liner.

4. A tape cassette as claimed in claim 1, wherein each bent-over longitudinal edge strip comprises a first portion adjacent to the said middle part and at the said angle and a second portion folded relative to the first portion.

5. A tape cassette as claimed in claim 1, wherein the bent-over longitudinal edge strips of each support liner come into contact with the back of the support liner when the roll of tape is in position.

6. A tape cassette, in particular a magnetic tape cassette, having top and bottom walls, one or more rolls of tape on a hub or on a flanged reel, onto which tape can be wound or from which tape can be unwound, one or more support liners between the roll(s) of wound tape and the bottom wall and between the said roll(s) and the top wall, each support liner having a planar middle part and folded longitudinal edge strips disposed laterally on opposite sides of the middle part, wherein each longitudinal edge strip is bent over into an overlying relationship with the middle part so that at least that portion of each strip adjacent to its associated middle part makes an angle of less than 90° with the plane of the middle part of the liner and so that the said edge strips of each liner support the middle part of the liner against the roll(s) of tape, within the periphery of said middle part, and the bent-over longitudinal edge strips of the support liner are electrically conductive.

7. A tape cassette as claimed in claim 6, wherein the bent-over longitudinal edge strips are provided with a conductive layer at least on the outside.

8. A tape cassette as claimed in claim 6, wherein the entire support liner is electrically conductive.

9. A tape cassette as claimed in claim 1, wherein the distance between the edges of the bent-over longitudinal edge strips is the same as or smaller than the diameter of the hub.

10. A support liner for a tape cassette, in particular a magnetic tape cassette, the tape cassette having top and bottom walls and one or more rolls of tape on a hub or on a flanged reel onto which tape can be wound or from which tape can be unwound, the support liner having longitudinal strips which are bent over or folded over into an overlying relationship with a middle part of said liner with a portion of said middle part and strips being designed to be positioned in the tape cassette between the roll of wound tape and the bottom wall or between the said roll and the top wall, wherein the support liner is provided with at least two bent-over longitudinal strips and, when the said strips are supported on a flat surface, and one or more rolls of tape are placed in position, the support liner remains substantially parallel to the flat surface.

11. A support liner as claimed in claim 10, wherein the bent-over longitudinal strips are formed by means of a fold at an angle and a parallel fold, relative to the plane of the middle part of the support liner.

12. A support liner as claimed in claim 10, wherein at least the bent-over longitudinal strips are electrically conductive.

13. A support liner as claimed in claim 12, wherein the bent-over longitudinal strips are provided with a conductive layer at least on the outside.

14. A support liner for a tape cassette, in particular a compact cassette, the tape cassette having top and bottom walls and two rolls of tape on two flangeless hubs onto which tape can be wound or from which tape can be unwound, the support liner having longitudinal strips which are bent over into an overlying relationship with a middle part of said liner with a portion of said middle part and strips folded over being adapted to be positioned in the tape cassette between the roll of wound tape and the bottom wall or between the said roll and the top wall, wherein the support liner is provided with two or more bent-over longitudinal strips having bent-over longitudinal strip edges, and, when the said strips are supported on a flat surface, and one or both rolls of tape are placed in position, the support liner remains substantially parallel to the flat surface, and wherein the distance between the edges of the said strips is the same as or slightly smaller than the diameter of the hubs.

15. A tape cassette having top and bottom walls, at least one roll of tape on at least one hub or flanged reel onto which tape can be wound or from which tape can be unwound and at least one support liner between the roll(s) of wound tape and the top wall and/or between the said roll(s) and the bottom wall, the or each support liner having laterally spaced apart longitudinal edge portions folded inwardly towards each other into an overlying relationship with a middle part of said liner.

* * * * *